Sept. 3, 1940.　　　　　G. BARTH　　　　　2,213,357
DIRECTION INDICATING MEANS
Filed March 15, 1938　　　2 Sheets-Sheet 1
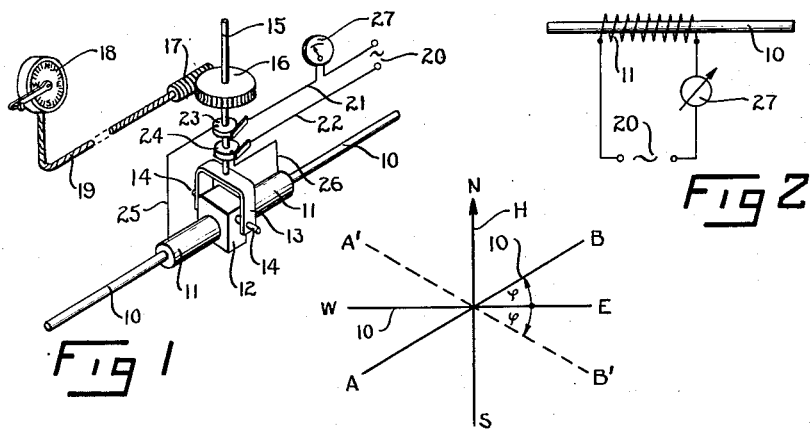
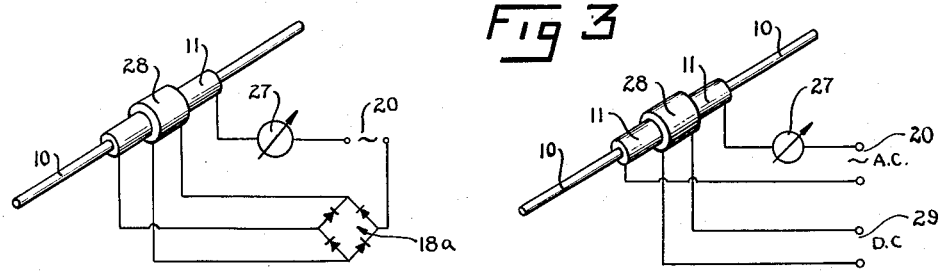
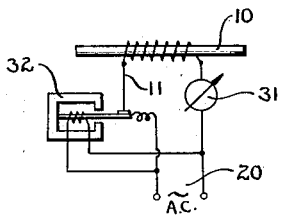
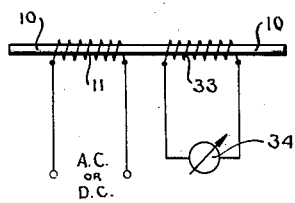
INVENTOR.
Gustav Barth
BY Stephen Cerstvik
ATTORNEY.

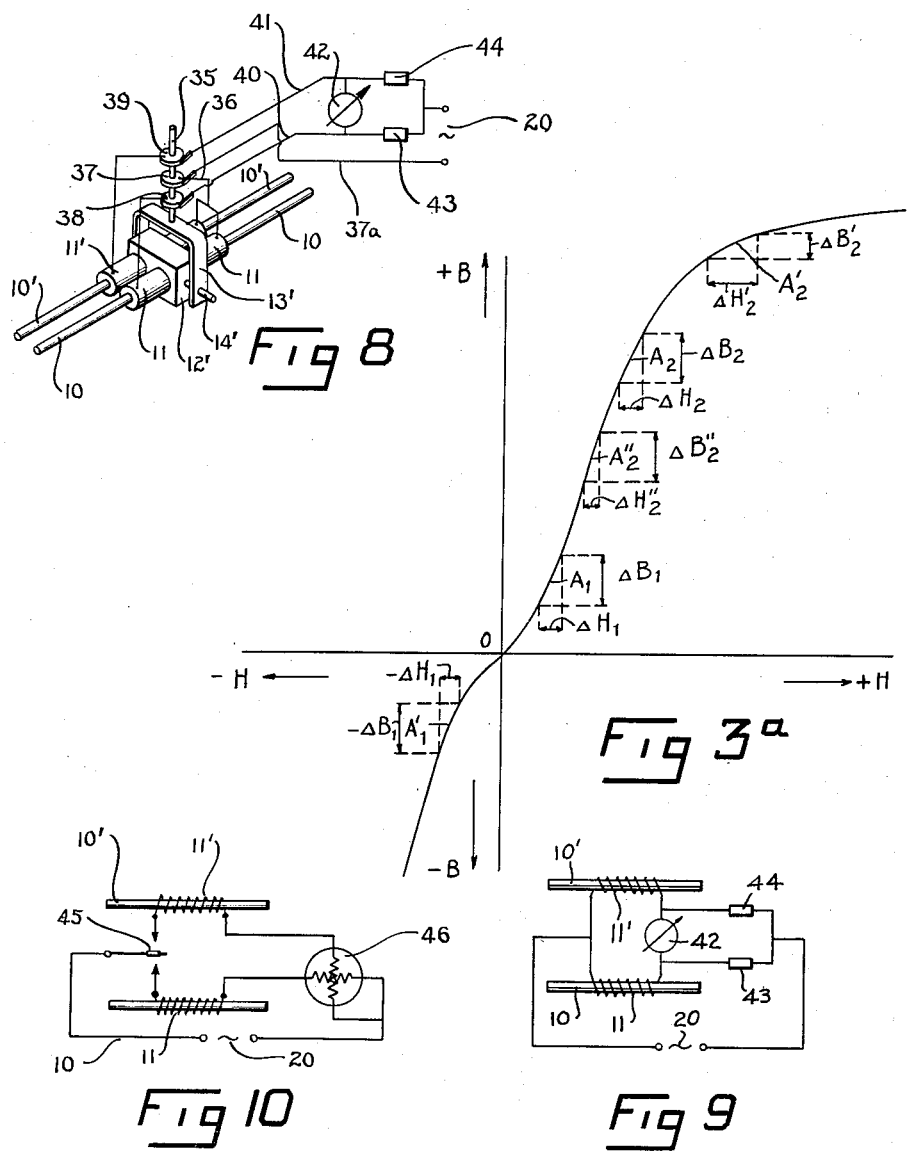

Patented Sept. 3, 1940

2,213,357

UNITED STATES PATENT OFFICE 2,213,357

DIRECTION INDICATING MEANS

Gustav Barth, Berlin, Germany, assignor to Siemens Apparate und Maschinen Gesellschaft mit beschränkter Haftung, Berlin, Germany, a corporation of Germany Application March 15, 1938, Serial No. 196,089
In Germany March 15, 1937

3 Claims. (Cl. 33—204)

This invention relates to direction indicating means and more particularly to apparatus for indicating the position of an object relative to a magnetic field, for example, the terrestrial magnetic meridian.

The invention consists above all in determining the direction of a vehicle such as an airplane relative to the north-south direction.

An object of the invention is to provide an apparatus light in weight and compact in size, the apparatus being based on the effect of the terrestrial magnetic field.

A further object of the invention is to provide a very simple apparatus suitable also for severe operating conditions.

A further object of the invention is to provide a system not capable of being oscillated which avoids the disadvantages present in oscillating systems, for instance, in fluid compasses.

The nature of the invention lies in the fact that one or more preferably rod-shaped bodies which are arranged in a certain position relatively to the longitudinal axis of the airplane and consisting of a material of good magnetic properties cooperate in such a manner with one or more windings which all or in part serve to produce a magnetic flux in the said body or bodies as to derive a direct measure for the desired relative position from the resistance or from the changes in resistance of one or more windings, said resistance or changes in resistance being brought about by the interaction between the magnetic alternating flux and the magnetic field, for instance, the terrestrial magnetic field.

According to the invention said body or bodies cooperate with windings serving all or in part to produce an alternating flux in the manner that one or more of said windings interact with the windings serving to produce the magnetic alternating flux and with the magnetic flux of the terrestrial field in said bodies and that a direct measure for the desired relative position is derived from the electromotive forces induced in the first-mentioned windings.

The above and further objects and novel features will more fully appear from the following detailed description when the same is read in connection with the accompanying drawings. It is to be expressly understood, however, that the drawings are for purposes of illustration only and are not intended as a definition of the limits of the invention, reference for this latter purpose being had primarily to the appended claims.

In the drawings, wherein like reference characters refer to like parts throughout the several views, Fig. 1 is an isometric view illustrating one embodiment of various details of the invention;

Fig. 2 is a detailed view of the wiring which may be employed in the embodiment shown in Fig. 1;

Fig. 3 is a diagram illustrating several positions of a magnetic body relative to the magnetic meridian;

Fig. 3a is a diagram illustrating the theory of the invention;

Fig. 4 is an isometric view of another embodiment of the invention;

Fig. 4a is an isometric of still another embodiment of the invention;

Fig. 5 is a diagram of the wiring similar to Fig. 2 illustrating the use of an interrupted D. C. source;

Fig. 6 is a diagram of the wiring which is a variation of the device of Fig. 5;

Fig. 7 is a diagram of the wiring similar to Fig. 2 but providing a variation thereof;

Fig. 8 is an isometric view of still another embodiment of the present invention;

Fig. 9 is a diagram of the wiring which may be employed in the embodiment shown in Fig. 8; and, Fig. 10 is a diagram of the wiring which may be employed in a further embodiment of the invention.

The form of the invention illustrated in the accompanying drawings by way of example is a device for indicating the position of an object relative to a magnetic field, for example, the earth's magnetic field. The device is constituted by one or a plurality of coils for which suitable cores are provided which are of highly magnetic transmissive material. In these cores a periodically varying magnetic field is produced by means of an alternating, a partially rectified alternating current, or an interrupted direct current. The variation in flux density produced within the core due to the presence of the alternating field of said core and the terrestrial field resulting from the angular disposition of the core changes the electromotive force of self-induction of the coil and thus alters the impedance of the circuit an amount corresponding to the strength of the coacting terrestrial magnetic component. This altered impedance produces a current change which provides a direct measure of the angular disposition of the core relative to the magnetic meridian.

In the form illustrated in Fig. 1, novel means are provided for measuring a component of the terrestrial field which acts in a horizontal plane, and for determining the angular disposition of the measuring means relative thereto, comprising an elongated shaft member 10, preferably of circular cross-section, which is composed of highly magnetic transmission material and which serves as a core for a winding or coil 11. In order that the coil and core may remain horizontal to insure the measurement of horizontal components of the earth's field, suspension means are provided therefor which, in the form shown, are constituted by a coil support 12 which is disclosed at the center of said coil and core and which is pivotally and eccentrically mounted upon a forked member 13 by means of shaft 14. A balance is thus obtained which enables automatic adjustment in the horizontal, for example, by a stabilizing weight (not shown) which may be attached to the lower portion of support 12. In order to permit an azimuth adjustment of the arrangement, fork member 13 is mounted upon a shaft 15 upon which, for example, a worm wheel 16 may be attached which is in mesh with a worm 17 and drivably connected to a control panel or annunciator 18 by means of a shaft 19.

Means are provided to produce a periodically varying field in coil 11 which will be adapted for cooperation with components of the terrestrial field in such a manner that the electromotive force of self-induction as ordinarily produced by the varying field will be changed in accordance with the strength of the terrestrial component coacting with said varying field. This change in self-induction will, in turn, alter the impedance and current of the circuit a corresponding amount. The means in the embodiment of Fig. 1 comprise alternating current source 20 which is connected by means of leads 21, 22 to the slip ring assemblies, 23, 24, respectively, and thence to the coil by leads 25, 26. Current changes which indicate the direction of disposition of the core within the field may be read at an ammeter 27 connected, for example, in lead 21.

In operation, alternating current source 20 produces in coil 11 a changing magnetic field, the rapidity of the change being a function of the current frequency. The effect of the changing field is to produce in said coil a counter-electromotive force. Core 10, inductively coupled thereto, is affected not only by the changing magnetic field but also by the uni-directional field of the earth. The change in flux density of the core due to the presence of the earth's field therein is dependent upon the angular relation of the core and the magnetic meridian. Assume (Fig. 3) that core 10 is perpendicular to the horizontal component of the terrestrial field, represented by H. In this position, the terrestrial field is ineffective to disturb the density of the alternating field of the core 10 and the current flowing in the coil as measured by ammeter 27 will be, for example, $I_o$. Now assume that member 10 moves through an angle $\Phi$, thus shifting from a perpendicular position to the position AB (Fig. 3). A component of the terrestrial component H now will coact with the alternating field of the core and will have a value which is a function of the sine of the angle $\Phi$. This unidirectional terrestrial component will be superimposed upon the alternating field in said core to change the flux density of the core and to change the self-induction and the impedance of the circuit to which it is coupled. The change in impedance will cause a corresponding change in the current measured at ammeter 27 and thus will cause the ammeter reading to be an indication of the angular disposition of the core in the terrestrial field. Assuming the new value of the current to be $I_F$, the difference between $I_o$ and $I_F$ will be proportional to the angle $\Phi$ and hence a measure of the angular position of core 10 relative to the terrestrial field H or the magnetic meridian.

The first embodiment, however, does not determine whether the angular change has occurred clockwise or counter-clockwise, i. e., whether core 10 has assumed the position AB or A'B'. For this reason, means are provided for determining the direction of rotation comprising a supplementary winding or coil 28 (Fig. 4) which is energized by direct current source 29 instead of alternating current source 20. The direct current produces a supplementary magnetic field of uniform direction which is linked to both coil 11 and core 10.

The theory of operation of the invention will be more readily appreciated by a reference to Fig. 3a. In the curve of Fig. 3a the abscissae represent the horizontal component of the earth's field intensity H and the ordinates represent the intensity of magnetization B produced in the core 10. The point 0 corresponds to a position W—E as illustrated in Fig. 3. If the core of the device of Fig. 1 be rotated clockwise out of this position into a position such as A'—B' which position forms an angle $\Phi$ with the original position, a constant magnetic flux is induced in core 10 by the earth's field. This flux corresponds to point $A_1$ on the magnetization curve of Fig. 3a. Since the permeability of the core is dependent upon the ratio $$\frac{dB}{dH}$$

there is produced a change in the effective permeability. In Fig. 3a this ratio at point $A_1$ is represented by $$\frac{dB_1}{dH_1}$$

or by the ratio $\Delta B_1$ to $\Delta H_1$. Since the A. C. resistance of winding 11 depends upon the permeability of the core 10 and the A. C. passing through the winding 11 is a function of the A. C. resistance thereof, changes in alternating current occur with changes in the permeability. Since the effective permeability will change with change in position of the core 10, the consequent current variations indicated by instrument 27 of Fig. 1 are indications of the variation in position of the core relative to the earth's field so that the current indication by instrument 27 is an indication of the deviation from the N—S position.

If the core 10 of Fig. 1 is turned counter-clockwise by an angle $\Phi$ to the position A—B in Fig. 3, the indication $A'_1$ of Fig. 3a indicates the flux density of the core at that point for the corresponding effective field intensity due to the horizontal component of the earth's field. In this position the value of the flux threading through core 10, due to the horizontal component of the earth's field, is the same as in position A'—B' discussed above. The change in permeability, the variation in A. C. resistance and the variation in current through winding 11 will be the same in positions A—B and A'—B'. In these two positions therefore, there is not an unequivocal indication of the position of the core 10 with respect to the N—S position or in other words the current through 27 does not indicate whether the core 10 has been rotated clockwise or counterclockwise from the position W—E. This undesirable operation is produced because the device is operated upon that part of the magnetization curve wherein the permeability remains practically constant with equal changes in movement from the "zero" position. It is necessary therefore to produce changes in permeability whose values will change constantly with changes in position of core 10.

In order to avoid the difficulty discussed above and to produce a continuous variation of the permeability with changes in position of core 10 the device, such as illustrated in Fig. 4, is utilized. In the device as illustrated in Fig. 4, an additional coil 28 is wound upon core 10 which coil is fed by a D. C. source 29. This direct current passing through the winding 28 produces a constant flux in core 10 whereby the point of operation on the magnetization curve is shifted to a point adjacent the knee thereof. The additional constant flux created by the D. C. source 29 and coil 28 may be said therefore to produce a "bias" on the core 10 so that it is biased to operate at a point such as $A_2$. This is the operating point of core 10 when no part of the horizontal component of the earth's magnetic field threads through core 10 or in other words by reference to Fig. 3, core 10 is in the W—E position. If now core 10 is turned clockwise to position A'—B', then the magnetic flux induced in the core by the earth's field is superimposed upon the "bias" flux. If said "bias" flux is so chosen as to be in the direction of A'—B', then the flux due to the earth's field will be added to the bias flux and the operating point on the magnetization curve of Fig. 3a is shifted to point $A_2'$. At this point the permeability of the core is reduced as compared to that at point $A_2$ and the A. C. resistance of winding 11 becomes smaller so that the A. C. passing through winding 11 and indicated by instrument 27 is increased.

If on the other hand, the core 10 of the device of Fig. 4 is turned counter-clockwise through the angle $\Phi$ to the position A—B of Fig. 3, the operating point on the curve of Fig. 3a is shifted from point $A_2$ to $A_2''$. At this point the permeability is increased over that at point $A_2$, the A. C. resistance is increased and the A. C. current passing through winding 11 and indicated by instrument 27 is decreased. The pointer movement of instrument 27 therefore when core 10 is rotated clockwise is in the opposite direction to its movement when core 10 is rotated counter-clockwise from position W—E. By the imposition of the proper magnetic bias on the core 10, it is possible therefore to produce indications on instrument 27 which will indicate whether the core 10 is moved clockwise or counter-clockwise from a reference position and the amount of swing of the pointer of instrument 27 is a measure of the amount of said movement.

Referring to the embodiment as illustrated in Fig. 4a novel means are provided whereby the definite indications of position as obtained by the device of Fig. 4 are amplified. In other words, the swing of the pointer of instrument 27 or the quantitative indications thereof are increased for any particular angular movement of the core 10. The discriminatory indication obtained by the device of Fig. 4 is also retained.

In the device of Fig. 4a as in the device of Fig. 4, an additional winding 28 is utilized. The D. C. for the energization of this winding, however, is obtained in a novel manner and the coil 28 is combined in a novel manner with the other elements of the device. Referring to Fig. 4a, coil 28 is illustrated as connected to the rectifier 18a whereby the A. C. which passes through the coil 11 is rectified and passes through the coil 28 to produce the bias of coil 11. The bias produced by coil 28 when core 10 is in the W—E position of Fig. 3 depends upon the value of the A. C. source 20 suppling winding 11. As the core 10 is shifted, the A. C. current passing through the coil 11 is changed so that the bias produced by coil 28 varies with the variation in position of core 10. In other words a shifting "bias" is produced which "bias" varies with the variation in position so that an amplification of the change in the flow of current through instrument 27 is produced for any measured number of degrees of turn of core 10. It will be seen therefore, that the device of Fig. 4a provides means for producing an amplification of the current representing the particular position of core 10 and it is to be noted that said amplifying device is extremely simple and constructed of very few parts.

It has been pointed out that in order to obtain a direction indication there must be a coaction of the terrestrial and a varying magnetic field and that the action of the former upon the latter is able to change the impedance of the circuit producing the varying field and, therefore, to change the current in said circuit in accordance with the angular relation existing between said fields. Although, in the previous embodiments, the varying magnetic fields have been produced by alternating current, they may be produced instead by a periodically varying direct current.

In the embodiment shown in Fig. 5, the periodically varying magnetic field is produced by a direct current from source 29 which is interrupted mechanically by a conventional interrupter 30 which is connected across coil 11. A direct current ammeter 31 provides direction indications as above set forth.

The operation of this and the first embodiment are similar.

In the form shown in Fig. 6, the varying magnetic field is produced by a mechanically rectified alternating current from source 20. The embodiment is similar in operation and construction to the first embodiment with the exception that a conventional rectifier 32 is connected thereto and a direct current ammeter 31 is employed.

A variation of the wiring as illustrated in Fig. 2 is shown in Fig. 7 wherein the coil 11 and core 10 are provided as in the previous forms. The varying magnetic field may be produced in coil 11 by either an alternating current or a periodically varying direct current. Instead of measuring current changes in the primary coil circuit as shown before, a secondary winding 33 is provided which is inductively coupled thereto and which will indicate the current changes in the primary produced by the earth's field as above set forth. Direction indications may be obtained by measuring either the secondary voltage or current by a suitable meter 34.

The operation of this embodiment is similar to the first embodiment with the exception that the direction indications are taken from the secondary coil 33.

In order to increase the sensitiveness of the apparatus and to produce more accurate readings, one or more coils 11 upon cores 10 may be associated in a Whetstone bridge connection such that the coils constitute the arms of the bridge. The remaining arms of the bridge may comprise variable resistances, inductance coils or the like. Here the changes in impedance provide the direction indications instead of changes in current.

In the embodiment shown in Figs. 8 and 9, the coils 11, 11' upon cores 10, 10', respectively, constitute two arms of a bridge connection wherein the changes in impedance are measured to provide direction indications. The cores may be mounted, as in the first embodiment, to maintain a horizontal balance by means of coil support 12' which is pivotally supported upon fork 13' by means of shaft 14'. In order to permit an azimuth adjustment, fork 13' is mounted upon vertical shaft 35 which serves as a mounting for slip rings which enable the coils to be connected with the associated bridge apparatus regardless of the angular position of said cores. One end of each coil is connected by lead 36 to a common slip ring 37 which, in turn, is connected to one side of the alternating current source 20. The opposite ends of the two coils 11, 11', are connected to slip rings 38, 39, respectively. Across leads 40, 41 which, in turn, are respectively connected to slip rings may be attached a suitable galvanometer 42 for detecting the balance of the bridge. If the frequency is in the sensitive audio range from 200 to 2500 cycles, head phones may be employed instead of a galvanometer. The other branches of the bridge may be constituted by variable non-inductive resistances 43, 44 connected to leads 40, 41, respectively. Secondary direct current windings 28 as in Fig. 3 or 4 (not shown in this embodiment) may be superimposed upon windings 11, 11' to enable the apparatus to indicate both the amount and direction of the angular changes relative to the magnetic meridian. The bridge circuit is so designed that the bridge indicating device is not affected by voltage, frequency or temperature changes.

In operation, assume that the impedance of the coils is known when in the east-west position, i. e., when uninfluenced by the earth's field. By adjustment of the variable resistances 43, 44, the present impedance is determined and compared to that when in the east-west position. The difference of these impedances is a function of the influence of the terrestrial component acting upon said coils and provides an indication of the angular disposition of said coils relative to the magnetic meridian.

In the form illustrated in Fig. 10, the two coils 11 and 11' are employed and may be mounted in a manner similar to that shown in Fig. 8; however, the method for indicating the changes in the electrical disturbance within the coils as produced by the earth's field differs from those previously described. In order to permit measurements to be made separately in both coils 11, 11', a double pole switch 45 is provided which is adapted for completing a separate connection through either of said coils through a suitable measuring instrument 46.

The operation of this embodiment, when either coil is connected by means of switch 45, is similar to that of the first embodiment.

There is thus provided a novel magnetic compass which does not employ rapidly rotating parts and which is consequently free from self-produced mechanical vibrations. It is compact in size and light in weight. The apparatus further employs the terrestrial field in a novel manner to produce an extremely sensitive and accurate means for indicating directions relative thereto.

Although several embodiments have been illustrated and described in detail, it is to be expressly understood that the invention is not limited thereto. For example, in the form shown, suitable amplifying means may be provided for amplifying the indications of the changes in impedance or any electrical disturbance which is caused by the coaction of the coil field and terrestrial field. In order to aid the magnetic transmissive qualities of the core 10, instead of employing a core of uniform cross section, there may be substituted a core of diminished central cross section. In the embodiments shown, a single core is provided for each surrounding coil; however, for this arrangement may be substituted a plurality of cores. Said coils may be arranged adjacent instead of surrounding the cores. Also for the mechanical rectifiers described herein may be substituted suitable electrical rectifiers. Various changes may also be made in the design and arrangement of the parts illustrated without departing from the spirit and scope of the invention as the same will now be understood by those skilled in the art. For a definition of the limits of the invention, reference will be had primarily to the appended claims.

What is claimed is:

1. In a device of the character described, a coil provided with a core, a source of periodically variable electrical energy connected to said coil, means for orienting said coil with respect to a directional magnetic field whereby the effective resistance thereof is varied to vary the energy through said coil and means including a second coil in inductive relationship with said first coil for producing a shifting bias on said core varying with the variation in energy passing through said first coil.

2. In a device of the character described, a core of permeable magnetic material, a coil wound on said core, means supplying a periodically varying current to said coil to produce a flux in said core, means for relatively varying the position of said core with respect to a directional field of force to produce an additional flux in said core whereby the current in said coil is varied, means for measuring the variation in said current, and means including a second coil inductively associated with said first coil for establishing the operating point on the magnetization curve of said core at such a value that relative variation of position of said core in one direction will increase the current in said first coil and relative variation of position of said core in the opposite direction will decrease the current in said last-named coil.

3. In a device of the class described, a core of permeable magnetic material, a coil wound on said core, means supplying a periodically varying current to said coil to produce a flux in said core, means for relatively varying the position of said core with respect to a directional field of force to produce an additional flux in said core whereby the current in said coil is varied, means for measuring the variation in said current, and means comprising a second coil surrounding said first coil and being in inductive relationship with the latter for establishing the operating point on the magnetization curve of said core at such a value that relative variation of position of said core in one direction will shift said point along said curve so as to increase the current in said first coil and relative variation of position of said core in the opposite direction will shift said point along said curve so as to decrease the current in said last-named coil.

GUSTAV BARTH.